(12) United States Patent
Rosson (10) Patent No.: US 12,321,018 B2
(45) Date of Patent: Jun. 3, 2025

(54) DUST PLUGS FOR SEALING MULTIPORT TERMINALS AND METHODS OF FABRICATING THE SAME

(71) Applicant: Corning Research & Development Corporation, Corning, NY (US)

(72) Inventor: Joel Christopher Rosson, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 217 days.

(21) Appl. No.: 17/975,829

(22) Filed: Oct. 28, 2022

(65) Prior Publication Data

US 2024/0142718 A1   May 2, 2024

(51) Int. Cl.
G02B 6/38   (2006.01)

(52) U.S. Cl.
CPC ......... *G02B 6/3849* (2013.01); *G02B 6/3842* (2013.01)

(58) Field of Classification Search
CPC .................. G02B 6/3842; G02B 6/3849
See application file for complete search history.

(56) References Cited

U.S. PATENT DOCUMENTS

| | | |
|---|---|---|
| 6,701,899 B2 | 3/2004 | Liskow |
| 7,394,964 B2 * | 7/2008 | Tinucci ................ G02B 6/3849 |
| | | 385/139 |
| 10,641,967 B1 | 5/2020 | Cote et al. |
| 10,768,382 B2 | 9/2020 | Cote et al. |
| D949,107 S | 4/2022 | Meyer et al. |
| 11,487,073 B2 | 11/2022 | Ripumaree et al. |
| 2021/0081695 A1 | 3/2021 | Wang et al. |
| 2021/0149140 A1 | 5/2021 | Jensen |
| 2021/0278607 A1 | 9/2021 | Cote et al. |
| 2021/0278687 A1 | 9/2021 | Tsuchiya |
| 2022/0236497 A1 | 7/2022 | Calvin et al. |

FOREIGN PATENT DOCUMENTS

| | | | |
|---|---|---|---|
| KR | 20130023661 A | * 3/2013 | ............... G02B 6/46 |
| WO | 2019/005198 A1 | 1/2019 | |
| WO | 2019/005199 A1 | 1/2019 | |
| WO | 2019/005200 A1 | 1/2019 | |
| WO | 2019/005201 A1 | 1/2019 | |
| WO | 2019/005202 A1 | 1/2019 | |
| WO | 2019/005203 A1 | 1/2019 | |

(Continued)

OTHER PUBLICATIONS

English Translation for KR-20130023661-A, 7 pages (Year: 2013).*

*Primary Examiner* — Daniel Petkovsek
(74) *Attorney, Agent, or Firm* — Michael E. Carroll, Jr.

(57) ABSTRACT

Dust plug assemblies and methods of their fabrication are disclosed. In one embodiment, a dust plug assembly includes a dust plug body having a lanyard receiving feature, and a sealing sleeve attached to an end of the dust plug body. The sealing sleeve has a passageway therethrough, and the lanyard receiving feature is disposed within the passageway. The dust plug body and the sealing sleeve define a primary groove. The dust plug assembly further includes a lanyard having an attachment feature. The attachment feature is coupled to the lanyard receiving feature, and the lanyard and the sealing sleeve define a secondary groove.

13 Claims, 7 Drawing Sheets

(56) References Cited

FOREIGN PATENT DOCUMENTS

| WO | 2019/005204 A1 | 1/2019 |
| WO | 2019/005789 A1 | 1/2019 |
| WO | 2019/006121 A1 | 1/2019 |
| WO | 2019/006176 A1 | 1/2019 |
| WO | 2019/006191 A1 | 1/2019 |
| WO | 2020/138745 A1 | 7/2020 |
| WO | 2020/242847 A1 | 12/2020 |
| WO | 2022/115271 A1 | 6/2022 |

\* cited by examiner

DUST PLUGS FOR SEALING MULTIPORT TERMINALS AND METHODS OF FABRICATING THE SAME

FIELD

The disclosure is directed to multiport terminals and, more particularly, to dust plug assemblies for sealing unused ports of multiport terminals.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

A multiport terminal is a device having a plurality of ports for receiving fiber optic drop cables that are then run to a commercial building or residence. In many cases, there are more ports than are needed and thus the multiport terminal has unused ports. Dust plugs may be inserted into unused ports to seal the multiport terminal from environmental exposure. However, present dust plugs have drawbacks, such as parting lines that are needed due to the molding process. Further, present dust plugs are fabricated by overmolding a flexible lanyard over a rigid dust plug body, which is a costly process and prevents custom dust plugs (e.g., different colors, lanyard sizes or shapes, etc.) from being easily fabricated.

Consequently, there exists an unresolved need for effective dust plugs that minimize leakage, reduce manufacturing costs, and provide for easy customization.

SUMMARY

Various embodiments of dust plug assemblies for sealing unused ports of a multiport terminal. The dust plug assemblies of the present disclosure do not require a molded component having a parting line in a groove, which eliminates a leak risk at the groove. The dust plug assemblies described herein provide a solution wherein the lanyard and the dust plug body are mechanically assembled rather than overmolded. Further, the lanyard captures a secondary sealing element on the dust plug body that is tapered and provides lead-in compressing during dust plug insertion, which is not possible with a simple O-ring design. The two-part design of the dust plug body and the sealing sleeve also eliminate the parting line on the groove for the secondary seal, which further minimizes leak risk.

In one embodiment, a dust plug assembly includes a dust plug body having a lanyard receiving feature, and a sealing sleeve attached to an end of the dust plug body. The sealing sleeve has a passageway therethrough, and the lanyard receiving feature is disposed within the passageway. The dust plug body and the sealing sleeve define a primary groove. The dust plug assembly further includes a lanyard having an attachment feature. The attachment feature is coupled to the lanyard receiving feature, and the lanyard and the sealing sleeve define a secondary groove.

In another embodiment, a dust plug assembly includes a dust plug body and a sealing sleeve attached to an end of the dust plug body. The sealing sleeve has a passageway therethrough, and the sealing sleeve includes a first latch arm and a second latch arm. The dust plug body and the sealing sleeve define a primary groove. The dust plug assembly further includes a lanyard comprising a barb. The first latch arm and the second latch arm retain the barb. The lanyard and the sealing sleeve define a secondary groove. The dust plug assembly further includes a primary sealing member disposed in the primary groove, and a secondary sealing member disposed in the secondary groove.

In yet another embodiment, a multiport assembly includes a housing comprising a plurality of ports and a dust plug assembly inserted in a at least one port of the plurality of ports. The dust plug assembly include a dust plug body having a lanyard receiving feature and a sealing sleeve attached to an end of the dust plug body. The sealing sleeve has a passageway therethrough, and the lanyard receiving feature is disposed within the passageway. The dust plug body and the sealing sleeve define a primary groove. The multiport assembly further includes a lanyard having an attachment feature. The attachment feature is coupled to the lanyard receiving feature. The lanyard and the sealing sleeve define a secondary groove. The multiport assembly further includes a primary sealing member disposed within the primary groove, wherein the primary sealing member provides a primary seal within an interior of the port, and a secondary sealing member disposed within the secondary groove, wherein the secondary sealing member provides a secondary seal at an opening of the port.

In yet another embodiment, a method of fabricating a dust plug assembly includes disposing a sealing sleeve over an end of a dust plug body, wherein the sealing sleeve includes a bonding ring and an energy directing feature extending from the bonding ring, the dust plug body includes an inner mating surface disposed within a passageway of the sealing sleeve, and the dust plug body and the sealing sleeve define a primary groove. The method also includes applying ultrasonic energy to the bonding ring such that the energy directing feature melts and forms an ultrasonic weld joint between the bonding ring and the inner mating surface, disposing a primary sealing member in the primary groove, disposing a secondary sealing member on an end of the sealing sleeve, and inserting an attachment feature of a lanyard into the passageway of the sealing sleeve and into a lanyard receiving feature of the dust plug body such that the lanyard receiving feature secures the attachment feature and the secondary sealing member is disposed within a secondary groove defined by the lanyard and the sealing sleeve.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

References will now be made in detail to the embodiments of the disclosure, examples of which are illustrated in the accompanying drawings. Whenever possible, like reference numbers will be used to refer to like components or parts.

The concepts disclosed are related to dust plug assemblies for sealing unused ports of a multiport terminal. Present dust plug assemblies are fabricated by overmolding a flexible thermoplastic elastomer lanyard onto a rigid thermoplastic substrate dust plug body. It is desirable to assemble the dust plug body onto the lanyard at the end of the multiport terminal assembly process in order to employ alternate dust plug designs, configurations and/or colors of dust plugs depending on the terminal configuration. Current multiport terminal designs provide no lead-in at the opening of the port. The dust plug is flush to the face of the port when installed. However, this complicates the secondary seal because there is no tapered/chamfered surface to compress the secondary seal during dust plug insertion. Further, present dust plugs are single molded components that contain an O-ring groove that is molded with a parting line on the groove floor. The groove must be molded with a parting line on the groove floor, which poses a leak risk.

Embodiments of the present disclosure are directed to dust plug assemblies where the lanyard and the dust plug body are mechanically assembled rather than overmolded. This design eliminates the need for parting lines in grooves of the dust plug, which reduces overall leak risks. Further, in embodiments of the present disclosure, a secondary sealing element is a tapered seal that provides lean-in compression during dust plug insertion, which is not possible with a traditional secondary O-ring.

Various embodiments of dust plug assemblies and methods of fabricating dust plug assemblies are described in detail below.

Figure 1:
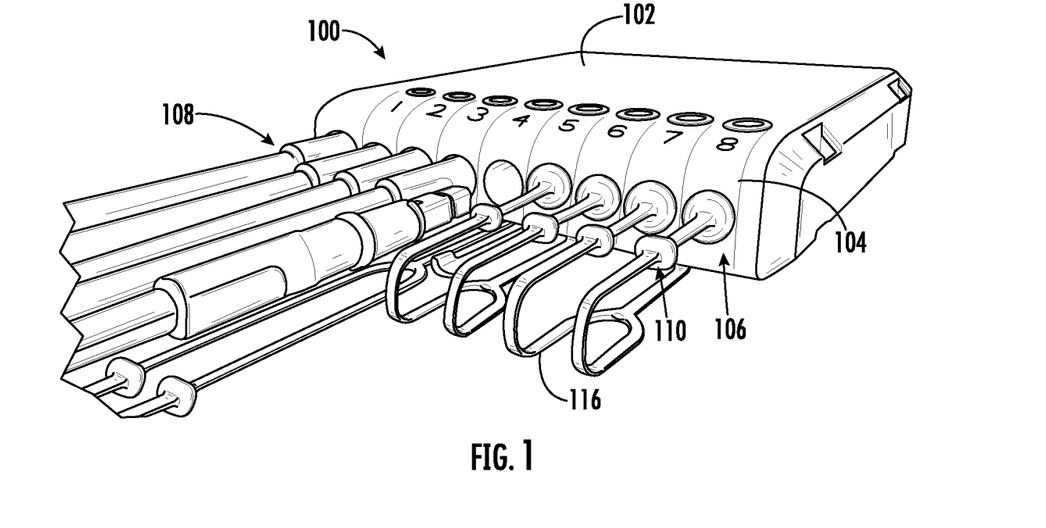
FIG. 1 illustrates an example multiport assembly according to one or more embodiments described and illustrated herein.

Referring now to FIG. 1, a non-limiting, fiber optic multiport assembly is illustrated. The fiber optic multiport assembly 100 includes a multiport terminal 102, a plurality of fiber optic connectors 108, and a plurality of dust plug assemblies 110. The multiport terminal 102 is configured to enable fiber-to-the-infrastructure (FTTx) for optical communication networks. As a non-limiting example, the multiport terminal 102 may be an Evolv™ terminal manufactured and sold by Corning Optical Communications of Charlotte, NC.

The multiport terminal 102 has a multiport body 104 that includes a plurality of ports 106 operable to receive a plurality of fiber optic connectors 108, such as fiber optic connector of drop cables, for example. The plurality of fiber optic connectors 108 may be PushLok™ connectors, as a non-limiting example.

In some instances, not all of the ports 106 of the multiport terminal 102 may be in use. For example, there may be more ports 106 than subscribers. To protect the internal components of the multiport terminal 102, dust plug assemblies 110 are inserted in unused ports 106. These dust plug assemblies 110 seal the unused ports 106 and protect the enclosure of the multiport terminal 102 from the environment.

Figure 2:
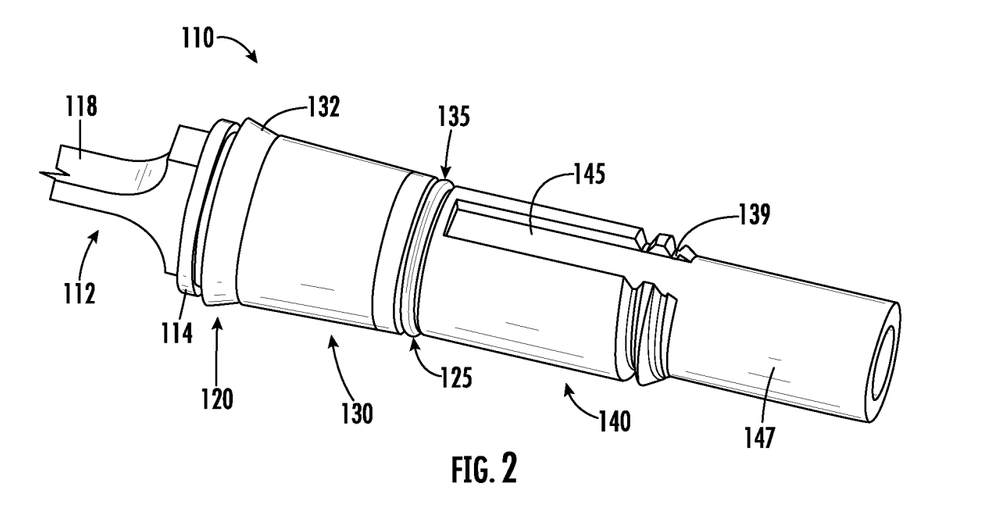
FIG. 2 is a perspective assembled view of an example dust plug assembly according to one or more embodiments described and illustrated herein.
Figure 3:
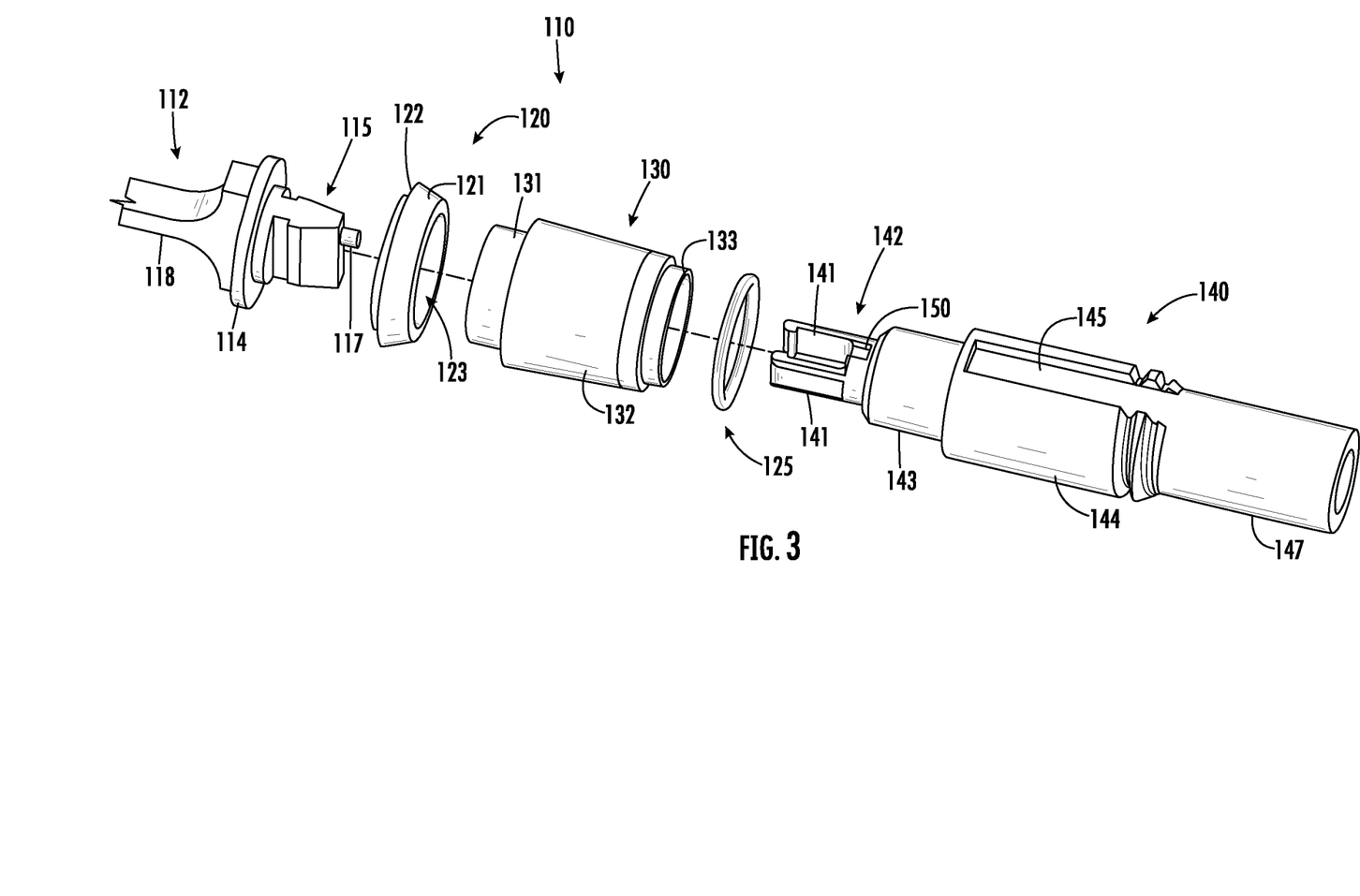
FIG. 3 is a perspective exploded view of an example dust plug assembly according to one or more embodiments described and illustrated herein.

Referring now to FIGS. 2 and 3, an example dust plug assembly 110 according to one or more embodiments of the present disclosure is illustrated. FIG. 2 illustrates a perspective assembled view of the dust plug assembly 110. FIG. 3 illustrates a perspective exploded view of the dust plug assembly 110. The example dust plug assembly 110 generally includes a dust plug body 140, a sealing sleeve 130, and a lanyard 112. The dust plug assembly 110 further includes a primary sealing member 125 for providing a primary seal in the interior of a port 106 and a secondary sealing member 120 for providing a secondary seal at the opening of the port 106. The dust plug body 140 and the sealing sleeve 130 may be molded from a rigid thermoplastic material (e.g., Ultem 2200), for example. The lanyard 112 may be molded from a flexible thermoplastic elastomer (e.g., Hytrel 4556), for example.

The dust plug body 140 comprises a first end 143, a midsection 144, and a second end 147. The second end 147 is the end that is inserted into an open port 106 of the multiport terminal 102. An outer surface of the midsection 144 includes an alignment groove 145 that is operable to receive an interior alignment feature (e.g., a tab or ridge, not shown) within the port 106 to ensure that the dust plug assembly 110 is inserted into the port 106 in only one orientation and to prevent rotation.

The first end 143 of the dust plug body 140 includes a lanyard receiving feature 142 to receive an attachment feature 115 of the lanyard 112, as described in more detail below. In the illustrated embodiment, the lanyard receiving feature 142 is configured as two latch arms 141 each having an inwardly facing catch portion 146. Other configurations are also possible. For example, more than two latch arms may be provided, or a socket may be used to receive a ball feature of the lanyard 112.

Figure 4:
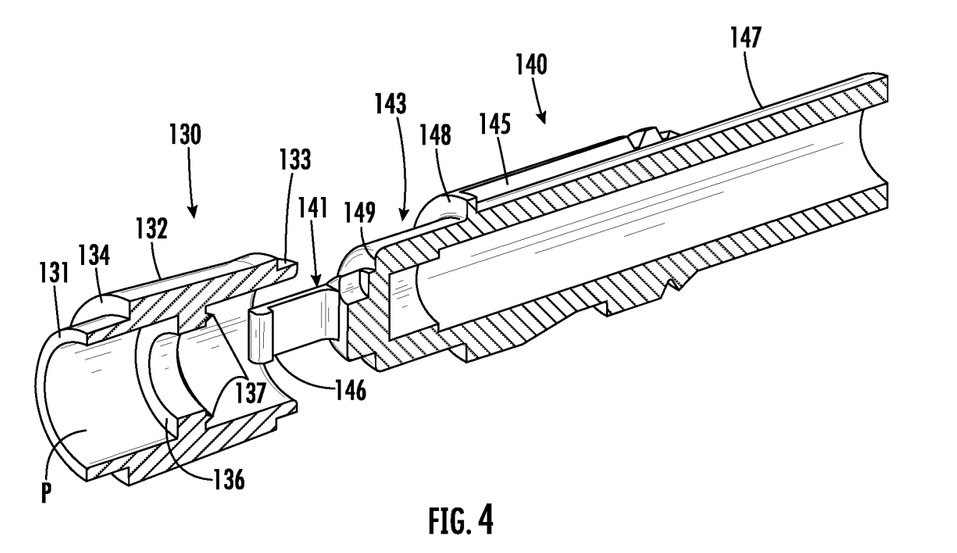
FIG. 4 is a cutaway view of an unassembled sealing sleeve and dust plug body according to one or more embodiments described and illustrated herein.
Figure 5:
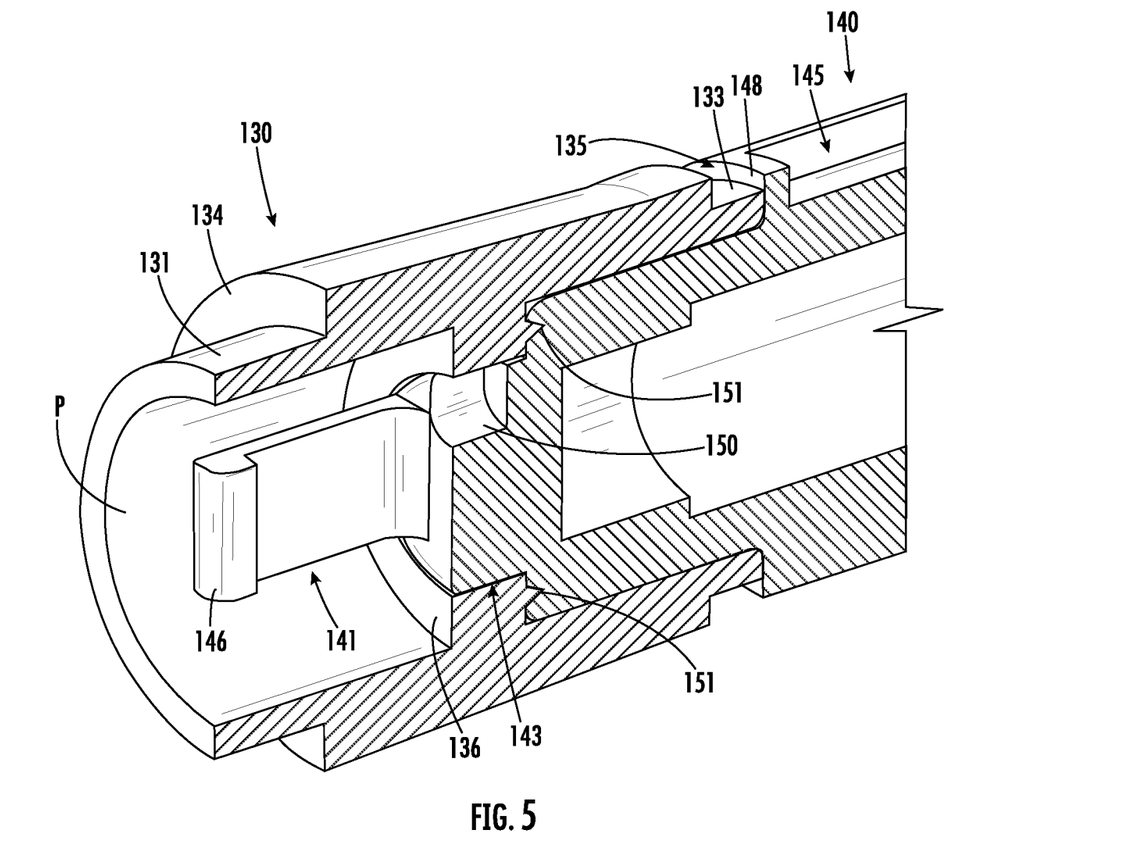
FIG. 5 is a cutaway view of an assembled sealing sleeve and dust plug body according to one or more embodiments described and illustrated herein.

The sealing sleeve 130 includes a passageway P, and is disposed on the first end 143 of the dust plug body 140. FIG. 4 is a cutaway view of the sealing sleeve 130 and the dust plug body 140 prior to the sealing sleeve 130 being disposed on the first end 143 of the dust plug body 140. FIG. 5 is a cutaway view of the sealing sleeve 130 disposed on the first end 143 of the dust plug body 140.

The dust plug body 140 includes a transition from the midsection 144 to the first end 143 that defines an outer mating surface 148. The first end 143 also includes an inner mating surface 149 from which the lanyard receiving feature 142 extends. The dust plug body may further include external threads 139 for mating with a dust cap, such as a dust cap from a connector.

The sealing sleeve 130 includes a first end 131 with a reduced outer diameter and a second end 133 also with a reduced outer diameter. As described in more detail below, the first end 131 and the second end 133 with reduced diameters form grooves for receiving sealing members.

The sealing sleeve 130 also includes in interior bonding ring 136, which is a region within the passageway P of the sealing sleeve 130 having a reduced inner diameter. An energy directing feature 137 extends from a surface of the bonding ring 136 facing the dust plug body 140. The example energy directing feature 137 is triangular in shape in cross section, and is configured to direct ultrasonic energy toward the inner mating surface 149 to form an ultrasonic weld joint 151, as described in more detail below.

Referring to FIG. 5, when the sealing sleeve 130 is disposed on the dust plug body 140, the first end 143 of the dust plug body 140 is within the bonding ring 136 of the sealing sleeve 130. The lanyard receiving feature 142 extends beyond the bonding ring 136. The outer diameter of the first end 143 and the inner diameter of the bonding ring 136 may be such that the first end 143 is within the bonding ring 136 by an interference fit.

The energy directing feature 137 contacts the inner mating surface 149. To bond the sealing sleeve 130 to the dust plug body 140, ultrasonic energy is applied to the sealing sleeve 130 to melt the material of the energy directing feature 137 and the inner mating surface 149, which causes reflow material to fuse and form a hermetic ultrasonic weld joint 151. Other methods for bonding the sealing sleeve 130 to the dust plug body 140 may be utilized, such as by an adhesive, for example.

The second end 133 of the sealing sleeve 130 may abut the outer mating surface 148. The second end 133 and the outer mating surface 148 define a primary groove 135 which receives a primary sealing member 125, which in the illustrated embodiment is an O-ring.

Referring once again to FIGS. 2 and 3, the lanyard 112 includes a pull portion 118, a flange 114, and an attachment feature 115. It is noted that the pull portion 118 is illustrated as a stub without a pull tab for ease of illustration. Example pull tabs 116 are shown in FIG. 1. The flange 114 and a wall 134 of the sealing sleeve 130 (see FIG. 4) define a secondary groove 132 in which the secondary sealing member 120 is disposed. The example secondary sealing member 120 has a straight portion 122 and a tapered portion 121 extending from an end of the straight portion 122. The flange 114 applies a compressive force on the straight portion 122 of the secondary sealing member 120 when the lanyard is inserted into the sealing sleeve 130. The tapered portion 121 is configured to be compressed against an inner surface of the port 106 of the multiport terminal 102.

Figure 6:
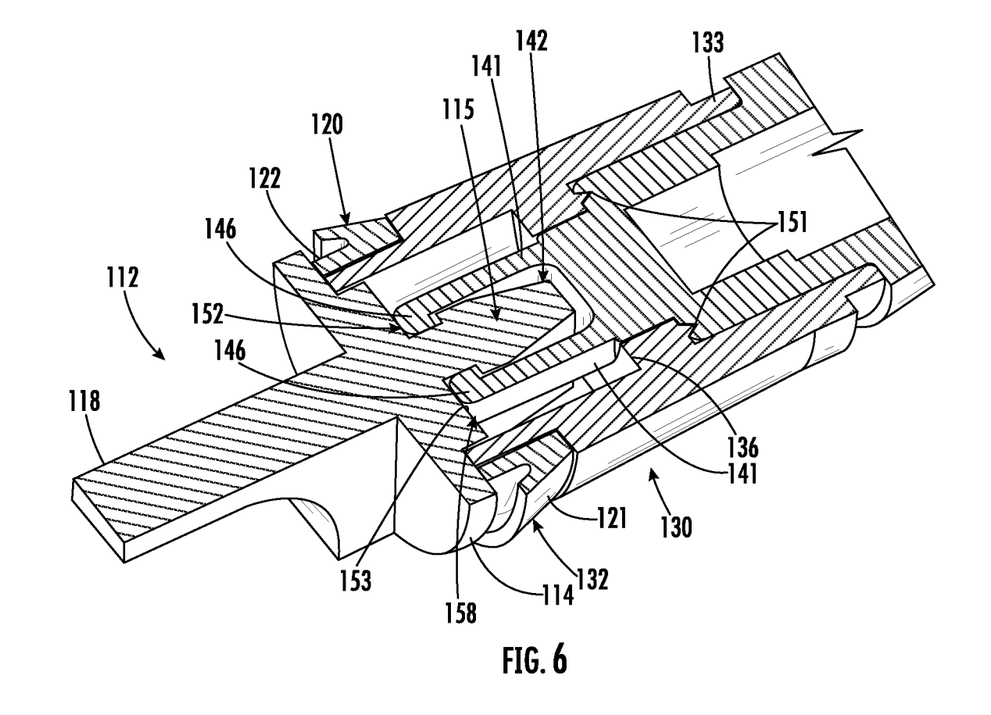
FIG. 6 is another cutaway view of an assembled sealing sleeve and dust plug body according to one or more embodiments described and illustrated herein.

Referring now to FIG. 6, a cutaway view of the lanyard 112, the sealing sleeve 130 and the dust plug body 140 is illustrated. The attachment feature 115 of the illustrated example is configured as a barb that is inserted into the passageway P of the sealing sleeve 130, and further between the two latch arms 141. The tapered shape of the barb pushes the two latch arms 141 outward until the end of the barb clears the catch portions 146 of the two latch arms 141, at which point the two latch arms 141 snap back and the secure the barb of the attachment feature 115. The catch portions 146 of the two latch arms are then disposed in grooves 152 between the barb and an inner wall 153 of the flange 114. Thus, the attachment feature 115 and the lanyard receiving feature 142 cooperate to secure the lanyard 112 to the dust plug body 140.

Figure 7:
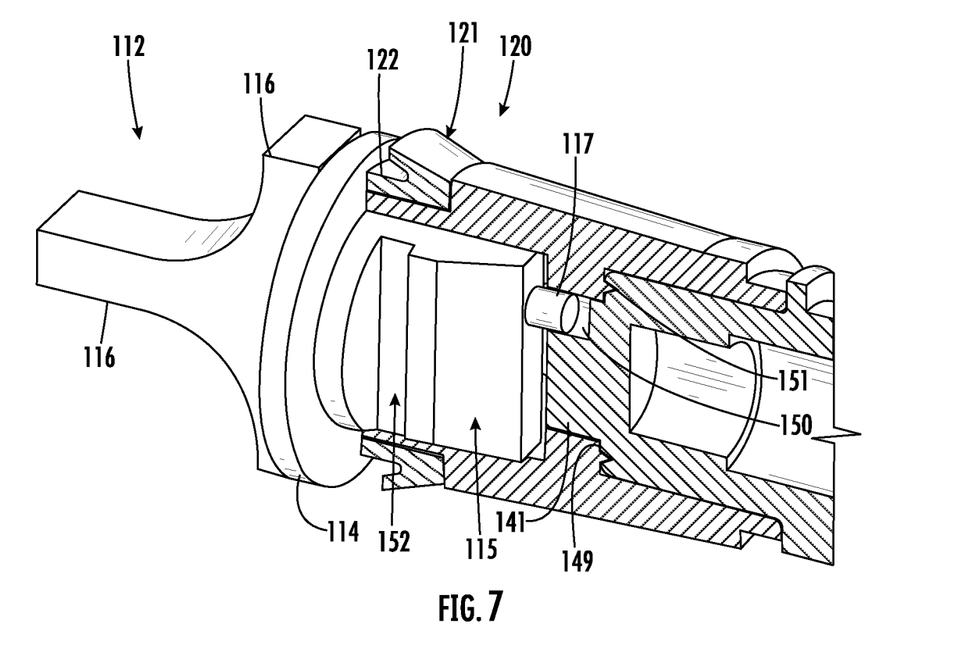
FIG. 7 is another cutaway view of an assembled sealing sleeve and dust plug body according to one or more embodiments described and illustrated herein.

In some embodiments, alignment features may be provided to align the lanyard 112 with the dust plug body 140 as well as prevent rotation of the lanyard 112 with respect to the dust plug body 140. Referring now to FIG. 7, another cutaway view of the lanyard 112, sealing sleeve 130, and the dust plug body 140 is provided. As shown in FIG. 7, as well as in FIG. 2, an alignment pin 117 extends from the attachment feature 115 or barb. The inner mating surface 149 of the dust plug body 140 has an alignment bore 150 sized and configured to receive the alignment pin 117.

The alignment pin 117 is offset from a center of the attachment feature 115. Similarly, the alignment bore 150 is offset from a center of the dust plug body 140. Thus, the position of the alignment pin 117 and the alignment bore 150 ensures that the lanyard 112 can only be inserted into the dust plug body 140 in one orientation.

Figure 8:
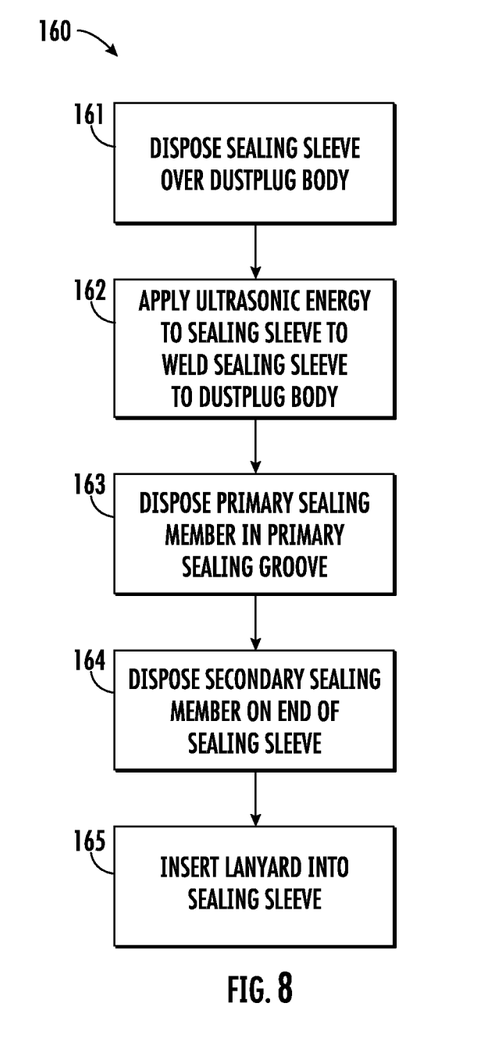
FIG. 8 is a flowchart illustrating an example method of fabricating a dust plug assembly according to one or more embodiments described and illustrated herein.

Referring now to FIG. 8, a flowchart 160 illustrating an example method of fabricating a dust plug assembly 110 is provided. At block 161, a sealing sleeve 130 is disposed over an end of a dust plug body 140. The sealing sleeve comprises a bonding ring 136 and an energy directing feature 137 extending from the bonding ring that contacts an inner mating surface 149 of the dust plug body 140.

At block 162, ultrasonic energy is applied to the sealing sleeve 130 proximate to the bonding ring 136 to form an ultrasonic weld joint 151 between the bonding ring 136 and the inner mating surface 149. A primary sealing member 125 is disposed in a primary sealing groove defined by the sealing sleeve 130 and the dust plug body 140 at block 163, and a secondary sealing member 120 is disposed on an end of the sealing sleeve 130.

At block 165, an attachment feature 115 of a lanyard 112 is inserted into the passageway P of the sealing sleeve 130 and into a lanyard receiving feature 142 of the dust plug body such that the lanyard receiving feature 142 secures the attachment feature 115 and the secondary sealing member 120 is disposed within a secondary groove defined by the lanyard 112 and the sealing sleeve 130.

It should now be understood that embodiments of the present disclosure are directed to dust plug assemblies for sealing unused ports of a multiport terminal. The dust plug assemblies of the present disclosure may not have a molded component having a parting line in a groove, which eliminates a leak risk at the groove. The dust plug assemblies described herein provide a solution wherein the lanyard and the dust plug body are mechanically assembled rather than overmolded. Further, the lanyard captures a secondary sealing element on the dust plug body that is tapered and provides lead-in compression during dust plug insertion, which is not possible with a simple O-ring design. The two-part design of the dust plug body and the sealing sleeve also eliminate the parting line on the groove for the secondary seal, which further minimizes leak risk.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A dust plug assembly comprising:
a dust plug body comprising a lanyard receiving feature;
a sealing sleeve attached to an end of the dust plug body, wherein:
the sealing sleeve has a passageway therethrough;
the lanyard receiving feature is disposed within the passageway; and
the dust plug body and the sealing sleeve define a primary groove; and
a lanyard comprising an attachment feature, wherein:
the attachment feature is coupled to the lanyard receiving feature; and
the lanyard and the sealing sleeve define a secondary groove.

2. The dust plug assembly of claim 1, wherein:
the sealing sleeve further comprises a bonding ring within the passageway;
the dust plug body further comprises an inner mating surface; and
the dust plug assembly further comprises an ultrasonic weld joint between the bonding ring and the inner mating surface.

3. The dust plug assembly of claim 1, wherein:
the dust plug body further comprises an outer mating surface;
an end of the sealing sleeve contacts the outer mating surface; and
the primary groove is at the outer mating surface.

4. The dust plug assembly of claim 1, wherein the lanyard receiving feature comprises a first latch arm and a second latch arm.

5. The dust plug assembly of claim 4, wherein:
the attachment feature of the lanyard comprises a barb; and
the first latch arm and the second latch arm retain the barb.

6. The dust plug assembly of claim 5, wherein:
the attachment feature further comprises an alignment pin extending from an end of the barb;
the lanyard receiving feature further comprises an alignment bore; and
the alignment pin is disposed within the alignment bore.

7. The dust plug assembly of claim 1, further comprising a primary sealing member disposed within the primary groove and a secondary sealing member disposed within the secondary groove.

8. The dust plug assembly of claim 7, wherein the primary sealing member is an O-ring and the secondary sealing member is a tapered sealing member.

9. The dust plug assembly of claim 1, wherein the dust plug body further comprises an outer alignment groove.

10. A method of fabricating a dust plug assembly, the method comprising:
disposing a sealing sleeve over an end of a dust plug body, wherein:
the sealing sleeve comprises a bonding ring and an energy directing feature extending from the bonding ring;
the dust plug body comprises an inner mating surface disposed within a passageway of the sealing sleeve; and
the dust plug body and the sealing sleeve define a primary groove;
applying ultrasonic energy to the bonding ring such that the energy directing feature melts and forms an ultrasonic weld joint between the bonding ring and the inner mating surface;
disposing a primary sealing member in the primary groove;
disposing a secondary sealing member on an end of the sealing sleeve; and
inserting an attachment feature of a lanyard into the passageway of the sealing sleeve and into a lanyard receiving feature of the dust plug body such that the lanyard receiving feature secures the attachment feature and the secondary sealing member is disposed within a secondary groove defined by the lanyard and the sealing sleeve.

11. The method of claim 10, wherein the lanyard receiving feature comprises a first latch arm and a second latch arm.

12. The method of claim 11, wherein:
the attachment feature of the lanyard comprises a barb; and
the first latch arm and the second latch arm retain the barb.

13. The method of claim 12, wherein:
the attachment feature further comprises an alignment pin extending from an end of the barb;
the lanyard receiving feature further comprises an alignment bore; and
the alignment pin is disposed within the alignment bore.

* * * * *